(12) United States Patent
Cinkler

(10) Patent No.: US 7,499,649 B2
(45) Date of Patent: Mar. 3, 2009

(54) METHOD FOR OPTIMISING A MOSTLY OPTICAL NETWORK

(75) Inventor: Tibor Cinkler, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1093 days.

(21) Appl. No.: 10/832,078

(22) Filed: Apr. 26, 2004

(65) Prior Publication Data

US 2004/0196837 A1    Oct. 7, 2004

Related U.S. Application Data

(62) Division of application No. 09/269,153, filed on May 18, 1999, now Pat. No. 6,748,170.

(51) Int. Cl.
*H04J 14/00* (2006.01)
(52) U.S. Cl. .................. 398/47; 370/351; 370/401; 370/328; 370/399; 370/395.2; 370/395.21; 370/395.3; 370/395.31
(58) Field of Classification Search . 370/395.1–395.12, 370/400–410, 328, 399, 395.21, 395.31
See application file for complete search history.

(56) References Cited

U.S. PATENT DOCUMENTS 5,502,816 A * 3/1996 Gawlick et al. ............. 709/227
6,069,890 A * 5/2000 White et al. ................ 370/352

FOREIGN PATENT DOCUMENTS

FR    0717532 A1 * 12/1994

* cited by examiner

*Primary Examiner*—Curtis Kuntz
*Assistant Examiner*—Phung-Hoang J Nguyen
(74) *Attorney, Agent, or Firm*—Roger S. Burleigh

(57) ABSTRACT

Method for forming the virtual topology of an ATM-layer where the ATM-layer is carried over an optical network, where inputs such as the physical topology and constraints of physical nature are given, thereafter forming node-pairs with end-to-end connections according to some known optimal routing algorithm, and finally applying a non-deterministic mathematical approach to obtain an optimal virtual topology with the objective of minimising the need for necessary electrical processing in the nodes of the network.

3 Claims, 1 Drawing Sheet

US 7,499,649 B2

METHOD FOR OPTIMISING A MOSTLY OPTICAL NETWORK

CLAIM OF PRIORITY UNDER 35 USC 119

This application is a divisional application of Ser. No. 09/269,153 filed on May 18, 1999, now U.S. Pat. No. 6,748,170 which claims priority under 35 USC 119 to Sweden application serial no. 9603081-2 filed on Aug. 26, 1996.

BACKGROUND OF THE INVENTION

1. Technical Field of the Invention

The invention relates to a method for solving optimisation problems occurring during the design of a mostly optical ATM network.

2. Description of Related Art

The technique of finding new solutions for designing networks based on Asynchronous Transfer Mode (ATM) or on All Optical Networks (AON) is a rapidly growing area of research in telecommunication and computer business. Both ATM and AON have own methodologies for simplifying network management and switching. Whereas ATM networks apply the VP (Virtual Path) concept, i.e many connections which have a common path in a part of the network are handled (managed, switched) together, the AONs assign the wavelengths to connections in such a way that connections of the same wavelength are handled together without any electrical processing during the transmission. Optical networks employ Wavelength Division Multiplexing (WDM) and specially designed algorithms allow a high aggregate system capacity due to spatial reuse of wavelengths.

A known idea, (Mukherjee, Ramamurthy and Banerjee, "Some principles for designing a wide-area optical network" IEEE 1994, pp. 110-119), is to combine the technology of AONs with ATM technique. By using optical amplifiers and switches in a mostly optical ATM network, the number of opto-electrical conversions can be reduced significantely, which leads to better signal quality and lower delays, but from the point of view of ATM there is a problem: the VPI/NCI modification in the cell header becomes impossible. The Wavelength Division Multiplexing (WDM) technique offers a good utilization of the fibre but the transmission capacity is divided into equal parts (channels) defined by the wavelengths used. Because of this partitioned capacity the statistical multiplexing (SM), which is another benefit of the ATM, has limits. SM can shortly be described as the gain accomplished when dynamically multiplexing together channels with bursty traffic into one channel, thereby eliminating those empty timeslots which may occur in the channels due to the burstiness. The larger the capacity, the lower the effective bandwith, therefore the resource usage is more efficient.

Combining the technology of AONs with ATM technique entails a loss of performance due to the loss of SM. The total effect though, is a gain due to the enhanced performance coming from the simplified VP management.

A use of this combined technique implies both advantages and drawbacks. The drawbacks are that the switching must be done on three different levels (instead of two), namely: 1. Pure optical switching for VPLs; 2. VP switching (Cross connects) where the switching is done on the basis of VPIs (VPIs are changed); 3. VC switching. The design procedure is computationally hard as the complexity is about the number of available wavelengths to the power of the number of nodes in the network. The main advantage though, is that many opto-electrical conversions can be avoided so that less CCs are required, thereby enhancing the performance.

There is a problem in how to make the architecture of systems like this optimal, i.e when designing backbone networks for example, one must assume full logical connectivity between the nodes in the network and try to find optimisation algorithms for best using the limited number of wavelengths to accomplish a high aggregate system capacity due to spatial reuse of wavelengths.

The architecture used in the IEEE-paper is a combination of well-known "singlehop" and "multihop" approaches as employed in many other WDM networks/proposals. The paper deals with optimising the cost, efficiency and throughput of the routing node by theorethical analysis. The optimisation is here split into two steps with the objective of minimising the average message delay caused by transfer: 1. They find and map a virtual topology into the given physical; and 2. Assign the wavelengths to links of the virtual topology. This technique brings about that the VP design is already performed in step one, meaning that the optimality criteria could be deteriorated and the delays could increase since if there are more end-to-end streams on a physical link than the allowed number of wavelengths, the paper proposes a rerouting of one of these streams. Hence, the average delay is increased as the wavelength assignment and the virtual topology forming are divided.

SUMMARY OF THE INVENTION

Combining ATM networks with an All Optical Network (AON) is a rather new technique with drawbacks and advantages. Here we try to design the virtual topology of an optimal ATM network on top of a AON. The optimality criterion refers here to making the ATM network "as optical" as possible, meaning that we want as long lightpaths as possible in the network without having to change the wavelength, i.e the total number of necessary wavelength changes in the network should be as few as possible, thereby minimising the need for the lightpaths to enter Crossconnects (CCs). This idea solves the problem by, and discloses a method for, finding an optimal routing of the VPCs so that the amount of VP switching can be maximally reduced. In ATM networks is an end-to-end connection associated with a VCC (Virtual Channel Connection). One or more VCCs are established on a VP Connection (VPC) which is built of one or more VP Links (VPL) along the path of the VCC. The VPL consists of one or more VPs concatenated. Hence, the VP is a "bundle" of VCCs along one physical link.

Along a VPL the VPI/NCI is not changed. Therefore no electrical processing is needed along the VPL, which also is the objective with the invention. Since no electrical processing is needed along a VPL, the same wavelength can be assigned to all of its components, i.e VPs. In this case the VPCs using these VPLs will not have to enter in the Cross Connects (CCs). They can be switched by passive optical switches. Since the limit on the processing capacity of CCs is dependent upon the internal bus speed, applaying an ATM network on top of an AON realise the use of much larger networks. The objective is to carry the cells by the virtual topology as far as possible in the optical domain. Packet forwarding from lightpath to lightpath is performed via electronic switching when required.

When we design a backbone network, full logical connectivity must be assumed, which means that every node must be able to connect every other node in the network. In general, the design consists of three problems to be solved optimally: 1. Route the VPCs; 2. Cut them into VPLs; 3. Dimension the VPLs. These problems are dependent of each other. When our model is applied, the third problem can be relaxed, instead we have a constraint: None of the VPL capacities should exceed the partition (channel) capacity. The invention proposes a two-phase method in order to accomplish optimality as often as possible, where the first phase involves finding one (or two for reliability purposes) node-and-vertex disjoint path(s) for each node-pair and assigning them capacities according to their traffic. The objective to be minimised when routing the VPCs is the total network cost. This calls for input parameters such as position of nodes, estimated traffic demands between nodes and the costs of building physical links between them when we design the network; or estimated traffic demands between the nodes and the physical topology with capacities given when we are rerouting the VPCs. The second part of the method involves a cutting of paths between node-pairs into sequences and merging these sequences into VPLs and assigning them a wavelength. The emphasis is laid on this second part. The objective to be minimised here is the total number of cuts of a VPC or in other words, minimising the number of VPLs along a VPC. It can mathematically be expressed as a constrained discrete optimisation problem, which can be solved by stochastic optimisation (e.g Simulated Annealing or Genetic Algorithm). The novelty of the invention lies in the two step model as a whole and especially the second step with the objective of the optimisation and the constraints, i.e. the formulation of the problem and how to apply stochastic optimisation onto this problem, i.e how to match the model to the optimisation algorithm, to obtain an optimal network with a minimum of use of electric processing.

The method gives the optimal virtual topology simultaneously with the wavelength assignment! Furthermore it does not increase the transfer delays in the network because we join some of the streams if enough capacity is available instead of a rerouting of one of the streams, which is necessary in prior art as the number of streams on a physical link are more than the number of available wavelengths.

BRIEF DESCRIPTION OF THE DRAWINGS

Embodiments of the invention will be described in connection with a drawing on which.

DETAILED DESCRIPTION OF THE DRAWINGS

Figure 1:
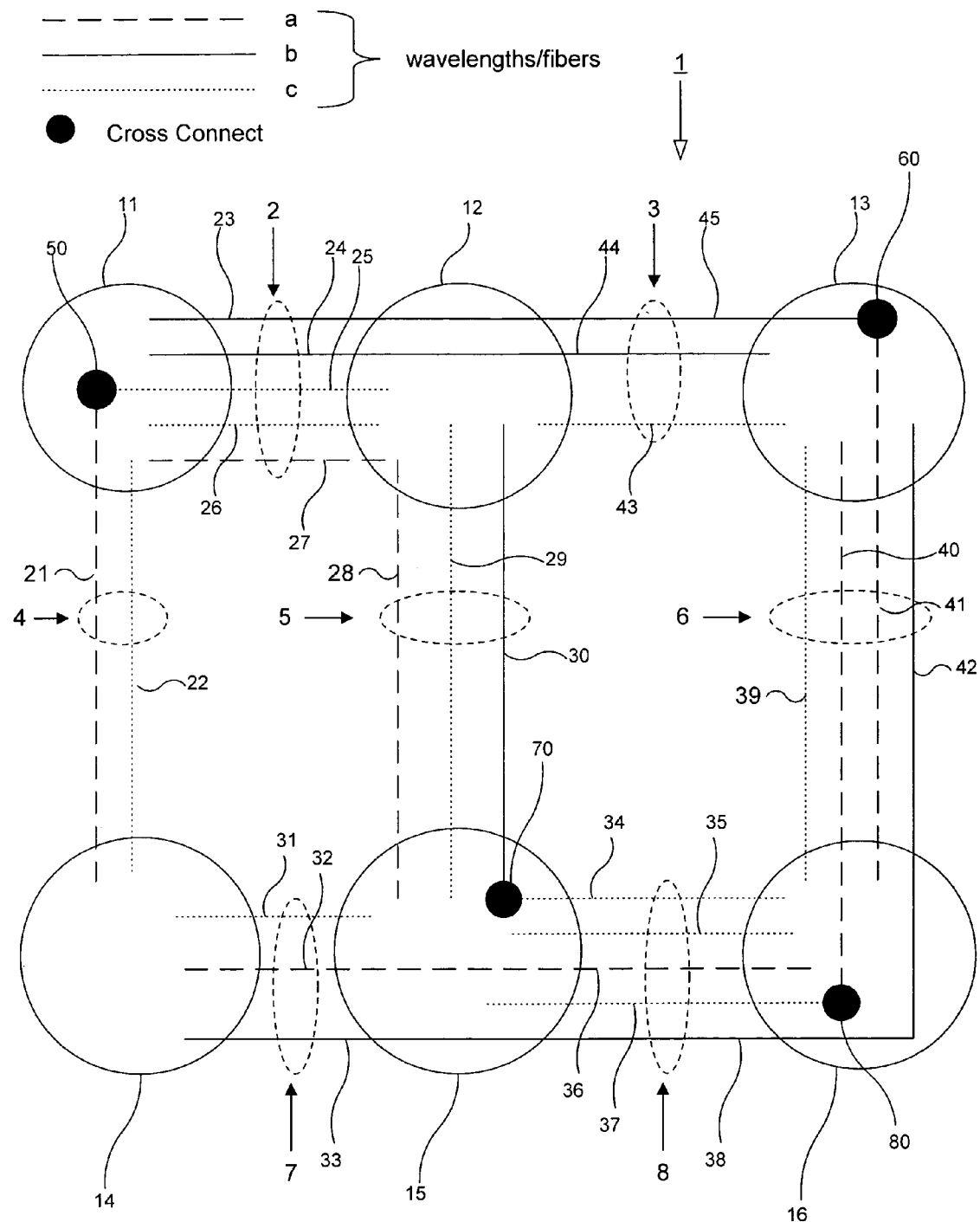
FIG. 1 shows an example of a six-node network with its physical and virtual topology, optimised according to the invention.

To make the presentation of the idea and the preferred embodiment easier, an example of a network is depicted in FIG. 1. The drawing shows the optimal six-node 11-16 ATM network over an optical network 1 employing Wavelength Division Multiplexing, WDM, or Space Division Multiplexing, Space DM. The number of nodes and the physical distance is of course arbitrary and the method shown is not limited to a network with the physical topology of that in the drawing. The nodes of FIG. 1 are interconnected by seven physical links 2-8 as seen in the figure. In this example we assume full logical connectivity and three different wavelengths a, b and c. With the given physical topology we obtain 15 VPCs: seven of length one (22;26;29;31;35;39;43;), six of length two (21 and 25; 24 and 44; 27 and 28; 32 and 36; 30 and 34; 37 and 40; ) and two of length three (23 and 45 and 41; 33 and 38 and 42). Altogether we have ten "hops", i.e. the passing of a node on the way from the originating node to the destination node, where electrical processing (wavelength reassignment and remultiplexing) could be needed if not the optimisation method according to the invention as showed below had reduced the number of hops. The optimisation method proposed has reduced the number of hops processed by Cross Connects (CCs) in this example from 10 to 4. These points 50,60,70,80, where the streams are mixed and where we need electrical processing and buffering, are showed in FIG. 1.

Given the position of the nodes, the traffic matrix, the physical links and their capacities, we start with the first step of the method which involves a routing of the Originator-Destination nodepairs or VPCs on top of the physical network based on any optimality criteria without any constraints related to the optical nature of the physical layer, e.g. shortest path, least loaded path or by the multi-commodity flow routing algorithm. This step contains nothing new so it will not be explained any further except from mentioning that if not the physical links and their capacities are given initially, we can adopt any known optimality criteria to these parameters too. However, even if step one is not important standing alone, it is important in combination with the second step since it ensures that optimality is not deteriorated when applying step two. Before a thorough description of step two it is important to clear up and define the many abbreviations the ATM-technology gave birth to.

The routes are divided into basic building units, which we in this application abbreviate bbus,—each of length of one physical link, in other words, a physical link is a set of bbus. Hence, in FIG. 1, there are altogether 25 bbus numbered from 21 to 45. The union of all physical links 2-8 and the nodes 11-16 is the network 1. A subset of one physical link is a VP (bbu's of the same wavelength) e.g. 34, 35 and 37. Therefore a physical link is a union of VPs. VPs are disjunct sets. The VPs cover all the bbus of a physical link. Serial grouping (union) of (one or more) VPs (of the same wavelength) is a VPL. Serial grouping of (one or more) VPLs is a VPC. An example will make this easier: The bottom right link 8 in the FIG. 1, contains five bbus 34-38, but three VPs only. The VPC of wavelength b between node 14 and 13 which passes link 8 consists of one single VPL which consists of three VPs 33, 38 and 42, and another VP on link 8 is the VP of wavelength c, which consists of parallel bounding of three bbu's, 34, 35 and 37. The bbu 34 is a part of a VPC between node 12 and 16 and is a VPL built up of only one VP. Since that VPC changes wavelength there is a need for electrical processing (Cross Connecting) in node 15. The Cross Connecting is visualized by reference numeral 70. For the node-pair 15 and 16 connected by the single bbu 35, the VP of wavelength c is a VPL and a VPC at the same time. The VPLs are the most important building blocks, since they are the parallel and serial grouping of bbus which do not need any processing. The VPCs only describe a sequence of VPLs used by a point-to-point stream.

The second step is as said based on an arbitrary first step and cuts paths between node-pairs into sequences and merges the sequences into VPLs assigning them a wavelength. The problem rapidly grows with the number of nodes and the number of available wavelengths. Already in the example given in FIG. 1 with six nodes and three available wavelengths and 25 bbus the state space consists of $3^{25}$ different states. Hence, the problem is extremely complex for such a small example. According to the idea, the problem will be significantely reduced if the state space is tightened by starting with assigning one and the same wavelength to all logical links of length one between adjacent nodes. In FIG. 1 this is illustrated by bbu 22;26;29;31;35;39;43 which all have been assigned wavelength c. This assignment does not deteriorate the generality of the model even though it simplifies it. The total complexity will be $3^7$ times lower: $3^{18}$. The problem now starts to take form. To continue with step two in the model, a mathematical formulation of the problem to be solved by the method is needed. In this first way described below a non-deterministic global optimisation, like e.g Simulated Annealing with "Cooling Schedule" or Genetic Algorithm or Tabu Search, is used to obtain the Objective Function which is to minimise the total number of VPLs (minimise the number of hops for each VPC). Below is shown according to the invention how the problem can be formulated to be solved by Simulated Annealing The Inputs are: The physical topology; One or more optimally chosen paths; The number of wavelengths supported by each fiber; Estimated busy-hour traffic demand of each node-pair; The transmission capacity of the fiber for each wavelength. The algorithm will give following Outputs: VPs, i.e the parallel boundling of bbus; VPLs, i.e the serial boundling of VPs along a VPC and the wavelength assigned to every single VPL. There are a number of constraints which must not be violated: The number of wavelengths/links may not exceed the given value; Transmission capacity of each wavelength should not be exceeded; Maximal number of hops along a VPC can be limited. The algorithm searches its way to global optima by making "elementary movements" which in this case is to change the wavelength of an arbitrary bbu in the network. There can be multiple global optima. An elementary movement is here defined as changing the wavelength of an arbitrary bbu and check whether the VPs in adjacent links can be concatenated to a VPL or not. If they are of the same wavelength and if all bbus of that wavelength are crossing both links then we concatenate these VPs into a VPL. After we evaluate the Objective Function: we count the total number of VPLs and if the constraints are violated we add a penalty term. While trying to minimise the Objective Function, the states where penalty is added are accepted with lower and lower probabilities. This is because of the "cooling" in Simulated Annealing. In Simulated Annealing we are randomly doing elementary movements. If the Objective Function has better value than in the previous step, it is accepted with higher probability, if worse with lower probability. Accepting a state means that we will move in the next step of the algorithm to one of the neighbours (adjacent states in the multidimensional state-space) of that state. While doing cooling, all states are in the beginning accepted with almost the same probability; at the end the probability of acceptance is getting almost deterministic: better movement is accepted, worse is refused.

When applying Simulated Annealing (with cooling schedule,) tests have shown that we get result in about $10^4$ steps. This result is a global optimum with probability about 0.8. If we repeat the whole procedure 10 times the probability of finding global optimum will be $1-(10^-7)$.

In another embodiment of the invention's step one and two, the optimisation procedure would work just as well if we instead of having multiple wavelengths, had multiple fibres (i.e Space Division Multiplexing instead of WDM). This would imply a use of cables containing more fibres and a use of the same wavelength in the whole network. In the example depicted in FIG. 1 this would mean that each physical link 2-8, would contain three fibres. The whole example would be exactly equivalent as the abovedescribed, with the difference that the three wavelengths a, b and c instead would denote three different fibres, each using the same wavelength. A VP would then be defined as one fibre in a physical link. Between fibres of different physical links, optical switching can easily be performed. One natural cause is then that if we form a VPL from multiple VPs (fibres), no traffic stream can enter or exit at nodes between these VPs.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for optimizing the routing of a data stream using Asynchronous Transfer Mode (ATM) over an optical network employing Space Division Multiplexing, wherein said network comprises a plurality of nodes interconnected by physical links comprised of a plurality of optical fibers suitable for carrying data at a common carrier wavelength, said method comprising the steps of:
  determining the number of hops for a plurality of logical links between pairs of said nodes, wherein each logical link is associated with a distinct Virtual Path Channel (VPC);
  assigning a first of said plurality of optical fibers to each logical link having only one hop; and
  for each logical link having more than one hop, i) employing a non-deterministic algorithm with the objective function of minimizing the total number of hops to separate each logical link into a sequence of logical link portions, or Virtual Path Links (VPLs); ii) selectively grouping at least a first VPL associated with a first VPC with a second VPL associated with a second VPC to form Virtual Paths (VPs) between adjacent ones of said nodes; and iii) assigning a second of said plurality of optical fibers to each said VP.

2. The method recited in claim 1, wherein said step of selectively grouping comprises the steps of:
  changing the assigned optical fiber of an arbitrary VPL;
  checking whether the VPs in adjacent links can be concatenated to a VPL;
  concatenate said VPs in adjacent links into a VPL if said VPs are assigned to the same fiber and if all such VPs belong to traffic streams which cross all VPs of said VPL.

3. The method recited in claim 2, further comprising the step of adding a penalty term to the objective function in that state if at least one constraint is violated, and then accepting said state with decreasing probability.

* * * * *